UNITED STATES PATENT OFFICE.

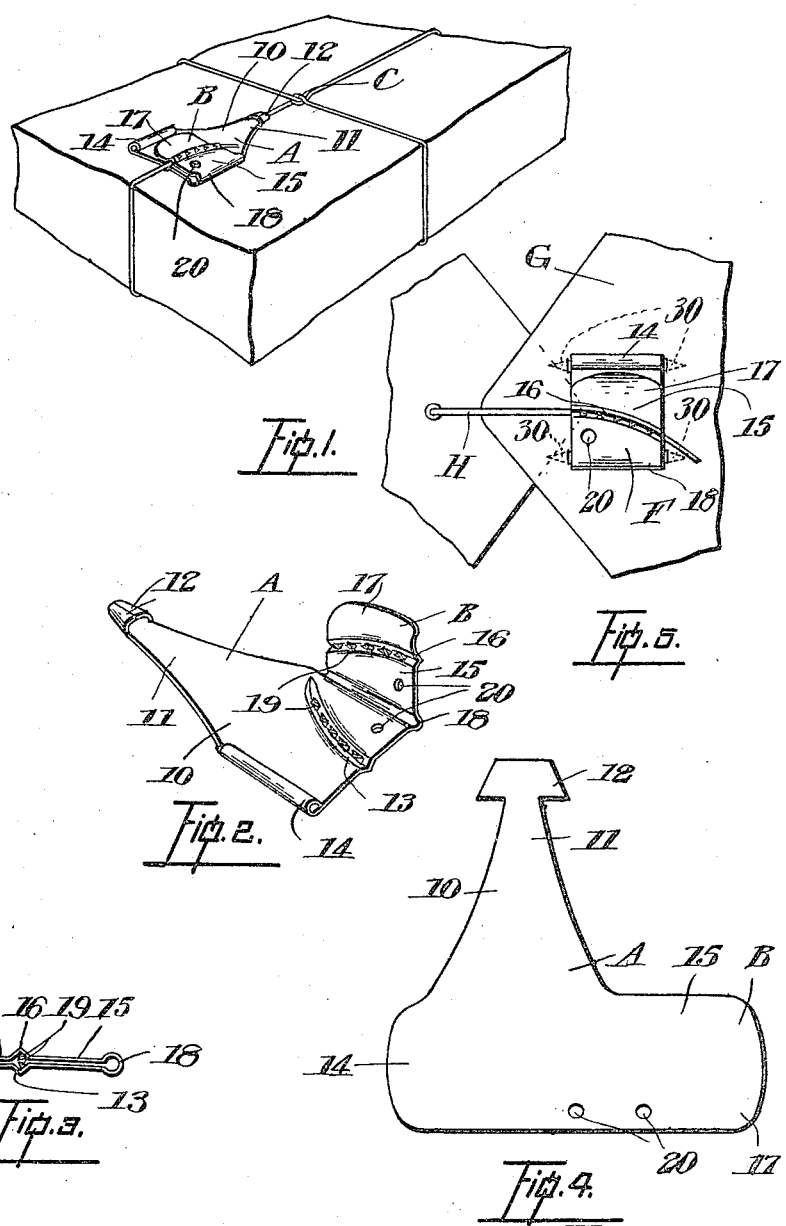

WILLIAM L. WALTON, OF BANTRY, NORTH DAKOTA.

FASTENER.

1,188,862.　　　　　Specification of Letters Patent.　　Patented June 27, 1916.

Application filed July 3, 1915.　Serial No. 37,957.

*To all whom it may concern:*

Be it known that I, WILLIAM L. WALTON, a citizen of the United States, and resident of Bantry, in the State of North Dakota, United States of America, have invented certain new and useful Improvements in Fasteners, of which the following is the specification.

This invention relates to improvements in fasteners adapted to be utilized on garments, parcels, envelops and the like, and the objects of the invention are to facilitate in attaching and detaching the fastener to and from the object supported or bound, to render the fastener compact, to simplify the construction so cheapening the cost of manufacture, and other objects which will be made clear hereafter, and the invention consists essentially of the improved fastener particularly described and set forth in the following specification and accompanying drawings forming part of the same.

In the drawings, Figure 1 is a perspective view of a parcel secured by the improved fastener. Fig. 2 is a perspective view of the resilient clip member of the fastener. Fig. 3 is an end elevation of the clip member. Fig. 4 is a plan view of the clip member in the primary stage of construction. Fig. 5 shows an alternative form of construction.

Like characters of reference refer to like parts in the several figures.

Referring to the drawings, A represents the improved fastener comprising the resilient clip member B and flexible member C. The clip member is made of a single flat piece of resilient metal 10 or like material having a shank 11 carrying laterally projecting wings 12 at one end adapted to be bent inwardly to embrace the flexible member C which is frictionally retained therebetween.

The body of the fastener is provided intermediate of its breadth with a curvilinear V-shaped groove 13 and is curled at one side 14, the opposite side having an integral tongue 15 provided with a curvilinear V-shaped groove 16 therein and an outwardly flared lip 17, the object of which will be made clear hereafter.

The junction of the body and the tongue 15 is rounded as at 18 to give greater resiliency to the tongue which is bent back on the body with the V-shaped grooves 16 and 13 registering. These grooves are provided on that side adjacent to the bend 18 with a plurality of offset projections 19 preferably disposed toward the shank 11 and designed to engage the free end of the flexible member C when embraced by the said grooves.

In using the fastener one end of the flexible member C is superimposed on the shank 11 whereupon the wings 12 are bent inwardly to embrace the same and frictionally retain it in position. The free end of the flexible member C is passed in the usual manner around the object to be bound and drawn to the required tension when the free end is pulled beneath the flared lip 17 of the tongue 15 and embraced by the V-shaped curves 16 and 13.

It will be clear that when the free end of the flexible member is so located any tendency to unloosen the fastening member by pulling on the body of the flexible member C will only tend to cause the projections 19 to bite more deeply into the periphery of the said flexible member so that there is no liability of the fastener becoming inadvertently disengaged.

To unloosen the fastener it is necessary to pull on the free end of the flexible member C thereby disengaging the same from the projections 19 when the said flexible member may be pulled outwardly beneath the tongue 15 and the flared lip 17 and the object unbound.

To facilitate in suspending the fasteners, I provide orifices 20 extending through the tongue 15 and body 10.

From the above description it will be clear that a fastener of this description may be used an unlimited number of times as there are no knots to untie, requiring the cutting or destroying of the flexible member in undoing the object bound.

In the alternative form of the invention shown in Fig. 5 the device is applied to the use of fastening the flap of an envelop to the envelop. The clip member F is similar in construction to that already described except that the extension for the cord is omitted and a plurality of tongues 30 are formed on it by which it may be fastened to an envelop G. The cord 10 is fastened to the flap of the envelop and adapted to be held by the clip in the manner already described.

What I claim as my invention is:

1. In a fastener of the class described, a main portion, a wing portion bent over adjacent to the main portion, and curved grooves on the main and wing portions, the groove on one part being adapted to register with that on the other.

2. In a fastener of the class described, a main portion, a wing portion bent over adjacent to the main portion, and V-shaped curved grooves on the main and wing portions, the groove on one part being adapted to register with that on the other.

3. A fastener of the class described comprising a clip member formed of a single piece of resilient material having one side curled, the opposite side having an integral tongue bent backwardly on the body and provided with a curvilinear groove having a plurality of projections therein, the said body being provided with a curvilinear groove having a plurality of projections and adapted to register with the first said groove, and a flexible member engaged at one end to the clip, the other end being adapted to be located in the said grooves.

In witness whereof I have hereunto set my hand in the presence of two witnesses.

WILLIAM L. WALTON.

Witnesses:
LEE O. KELLER,
H. M. WALTON.

Copies of this patent may be obtained for five cents each, by addressing the "Commissioner of Patents, Washington, D. C."